United States Patent
Allen et al.

(10) Patent No.: US 11,760,880 B2
(45) Date of Patent: Sep. 19, 2023

(54) GEL COMPOSITIONS

(71) Applicants: UNIGEL IP LIMITED, Central (HK); UNIGEL LIMITED, East Sussex (GB)

(72) Inventors: Scott Allen, Central (HK); Adrian Chisholm, Central (HK); Mukhtiar Singh Sohal, Central (HK); Ivan Tory, Central (HK)

(*) Notice: Subject to any disclaimer, the term of this patent is extended or adjusted under 35 U.S.C. 154(b) by 41 days.

(21) Appl. No.: 17/378,523

(22) Filed: Jul. 16, 2021

(65) Prior Publication Data

US 2022/0017748 A1 Jan. 20, 2022

(30) Foreign Application Priority Data

Jul. 17, 2020 (GB) .................................. 2011030

(51) Int. Cl.
| | |
|---|---|
| *H01B 7/18* | (2006.01) |
| *C08L 91/00* | (2006.01) |
| *C08J 9/32* | (2006.01) |
| *C08L 53/02* | (2006.01) |
| *H01B 7/285* | (2006.01) |

(52) U.S. Cl.
CPC ............. *C08L 91/00* (2013.01); *C08J 9/32* (2013.01); *C08L 53/025* (2013.01); *C08J 2203/22* (2013.01); *C08J 2353/02* (2013.01); *C08J 2391/00* (2013.01); *H01B 7/18* (2013.01); *H01B 7/285* (2013.01)

(58) Field of Classification Search
CPC .... C08J 9/32; C08K 7/23; C08L 25/08; H01J 13/02; H01B 7/02–7/18; H01B 7/00
USPC .................. 174/110 R–113 R, 120 R–122 SC
See application file for complete search history.

(56) References Cited

U.S. PATENT DOCUMENTS

| | | | | | |
|---|---|---|---|---|---|
| 4,176,240 | A | * | 11/1979 | Sabia .................... | C08L 53/025 174/23 C |
| 4,351,913 | A | * | 9/1982 | Patel ..................... | C08J 9/32 521/54 |
| 4,757,100 | A | * | 7/1988 | Wichelhaus ........ | G02B 6/4494 523/218 |
| 4,798,853 | A | * | 1/1989 | Handlin, Jr. ......... | C08L 53/025 523/173 |
| 5,049,593 | A | * | 9/1991 | Marciano-Agostinelli ................. B29C 48/06 524/521 |
| 5,698,615 | A | * | 12/1997 | Polle .................... | G02B 6/4494 385/100 |
| 6,451,865 | B1 | * | 9/2002 | Migchels ............. | C08J 9/32 521/54 |

(Continued)

FOREIGN PATENT DOCUMENTS

| | | | | |
|---|---|---|---|---|
| CN | 101876735 A | | 11/2010 | |
| GB | 2360781 A | * | 3/2001 | ............... C08J 9/32 |

(Continued)

OTHER PUBLICATIONS

Combined Search and Examination Report of GB2011030.0 dated Dec. 23, 2020 (8 pages).

(Continued)

*Primary Examiner* — William H. Mayo, III
(74) *Attorney, Agent, or Firm* — Quarles & Brady LLP

(57) ABSTRACT

Gel compositions for filling cables, such as communication cables, in particular gel compositions containing microspheres, cables containing said gels, and methods of preparing such gels.

16 Claims, 1 Drawing Sheet

(56) References Cited

U.S. PATENT DOCUMENTS

| | | | | |
|---|---|---|---|---|
| 6,723,686 | B2* | 4/2004 | Calle | H01B 3/28 |
| | | | | 508/591 |
| 7,247,796 | B2* | 7/2007 | Hagen | C08L 53/02 |
| | | | | 174/113 C |
| 7,253,217 | B2 | 8/2007 | Sohal | |
| 7,750,243 | B1 | 7/2010 | Mumm et al. | |
| 2004/0063812 | A1* | 4/2004 | Sohal | C08K 7/16 |
| | | | | 523/218 |

FOREIGN PATENT DOCUMENTS

| | | | |
|---|---|---|---|
| GB | 2360781 | A | 10/2001 |
| KR | 20110132763 | A | 12/2011 |

OTHER PUBLICATIONS

International Search Report dated Oct. 20, 2021, in Application No. PCT/GB2021/051839 (2 pages).

* cited by examiner

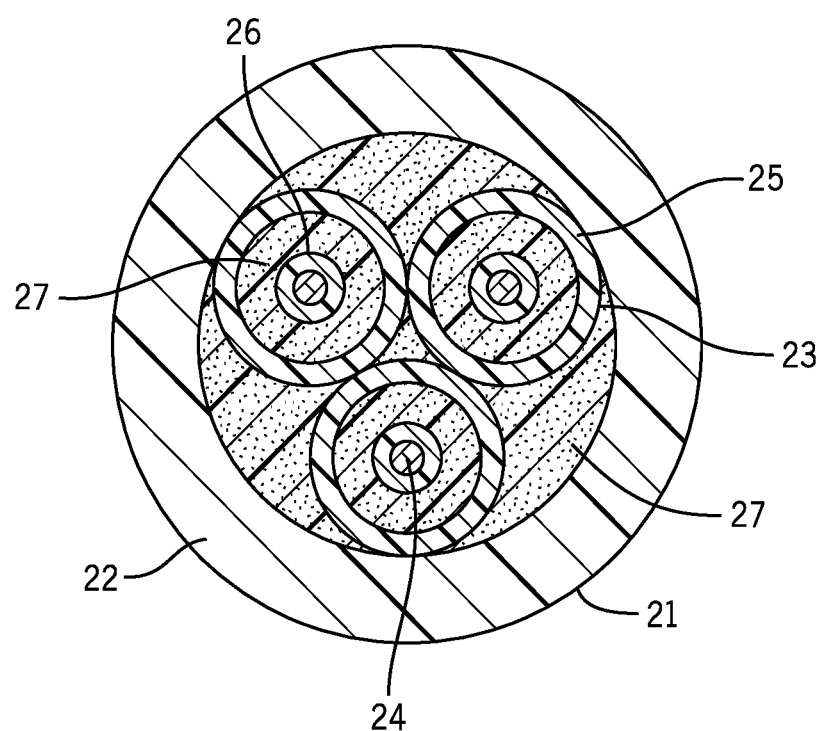

GEL COMPOSITIONS

CROSS-REFERENCE TO RELATED PATENT APPLICATIONS

The present application is a U.S. Application under 35 U.S.C. § 111(a) and claims the benefit of priority under 35 U.S.C. § 119 to United Kingdom Application GB 2011030.0, filed on Jul. 17, 2020 the content of which is incorporated herein by reference in its entirety.

TECHNICAL FIELD

This invention relates to gel compositions for filling cables, such as communication cables, in particular to gel compositions containing micro spheres, and to methods of preparing such gels.

BACKGROUND OF THE INVENTION

Communications cables typically comprise a signal-conducting core surrounded by a protective sheath. The core can, for example, conduct light signals or electrical signals. In many cables the space between the conductor and sheath contains a filler, the role of which is to protect and cushion the core from external forces that might be produced by, for example, bending or coiling, particularly in the case of fibre-optic cables. A further role of the filler is the prevention of water ingress which is particularly pertinent should the core comprise a metal such as copper. In order to fulfil these requirements, the filler must display a number of characteristics. The filler must be of sufficient viscosity in order to allow lateral movement of the core which occurs during, for example, bending, coiling or laying. The viscosity must however not be so low as to allow a drip wise loss of filler during vertical laying of cables. Moreover, this balance of properties must be maintained over a temperature range of −40 to +80 C. The filler must be formulated to be chemically compatible with cable grade polymers, which includes not only the cable sheath but also coatings typically found on optical fibres. The filler should also show a high degree of elasticity in order to absorb the force of impacts that the cable sheath may undergo during its operating lifetime. Relatively high ambient temperatures can be reached through fabrication of such cables resulting in thermal expansion of the filler, which then leads to the formation of holes and cavities on cooling. Such holes and cavities can potentially become a water path, which in fibre optic cables can lead to attenuation of the light wave guide. Thus, cable fillers should ideally show low thermal conductivity. For electrical applications or cores transmitting electrical signals, it is advantageous if the filler has a low permittivity, thus insulating the conducting core. This has the additional benefit of rendering the filler hydrophobic thereby protecting the core from water ingress. The anti-drip resistance of fillers can be improved by reducing their specific weight. Finally, for easy handling, it is preferred if the filler is semi-dry to the touch, rather than sticky.

WO2001/74480A1 discusses a composition suitable for use as a cable filler, which comprises a dispersion of microspheres in a gel comprising an oily base and an organic polymeric gelling agent.

The oil may be a naphthenic or paraffinic processing oil, a mineral oil, a synthetic product such as a polybutane or a silicone oil.

SUMMARY OF THE INVENTION

The invention provides a composition suitable for use as a cable filler, comprising a dispersion of compressible hollow microspheres in a gel, the gel comprising: a base oil comprising a synthetic oil; and an organic polymeric gelling agent comprising a styrene block copolymer; wherein the synthetic oil is produced from a feed chemical which is either natural gas or low molecular weight linear alpha-olefins.

The invention further provides a cable, such as a communications cable, containing as a cable filler a composition as defined hereinabove.

The invention further provides a process for making a cable, such as a communications cable, more particularly fibre optic cable, containing as a filler a composition as defined hereinabove.

BRIEF DESCRIPTION OF THE DRAWINGS

FIG. 1 shows a cross-sectional view of a fibre optic cable.

DETAILED DESCRIPTION

Communications cables have conventionally been manufactured using polyethylene as outer insulation. However, polyethylene is less suitable for use with fibre optic cables and instead, polypropylene is preferred due to its improved properties such as a higher bend radius. It has been found that the use of polypropylene is not compatible with the base oils conventionally used in filler compositions for cables: oils such as naphthenic or paraffinic processing oil, a mineral oil, or a silicone oil. These conventional base oils typically have a weight gain compatibility indication in the range of 15 to 20% or greater when measured according the procedure described hereinbelow. Conventional petrochemical derived oils often have a weight gain compatibility indication about 20% or greater.

Traditionally in the communications cable industry, the standard base oils used in gels are oils which are direct fractions of crude extraction. The term "Synthetic Oil" as used herein is defined as an oil which is produced from a feed chemical which is either natural gas or low molecular weight linear alpha-olefins. Preferably, the "synthetic oil" used in the present invention is selected from (i) Group IV base oils, also known as polyalphaolefin (PAO) synthetic base oils; and (ii) gas-to-liquid oils; or mixtures thereof. Group IV base oils are pure chemicals synthesised using ethylene gas in a chemical plant. Gas-to-liquid oils are synthetic oils that have been produced from the conversion of syngas from any source, such as natural gas, biogas, or other hydrocarbon gas sources. In contrast, traditional oils, which are direct fractions of crude extraction, are created by the distillation and refining of crude oil. More preferably, the Group IV base oil (polyalphaolefin) is selected from 1-hexene homopolymer hydrogenated, 1-octene homopolymer hydrogenated, and mixtures thereof.

As a first embodiment, Embodiment 1, the invention provides a composition suitable for use as a cable filler, comprising a dispersion of compressible hollow microspheres in a gel, the gel comprising: a base oil comprising or consisting of a synthetic oil; and an organic polymeric gelling agent comprising a styrene block copolymer; wherein the synthetic oil is produced from a feed chemical which is either natural gas or low molecular weight linear alpha-olefins.

As a second embodiment, Embodiment 2, the invention provides a composition as defined in Embodiment 1, wherein the synthetic oil is selected from (i) Group IV base oils, also known as polyalphaolefin (PAO) synthetic base oils; and (ii) gas-to-liquid oils; or mixtures thereof.

As a third embodiment, Embodiment 3, the invention provides a composition as defined in Embodiment 1 or 2, wherein the base oil comprises or consists of a fully synthetic oil.

As a further embodiment, Embodiment 4, the invention provides a composition as defined in Embodiment 1 or 2, wherein the base oil comprises or consists of a blended synthetic oil.

As a further embodiment, Embodiment 5, the invention provides a composition as defined in any preceding Embodiment, wherein the base oil does not comprise a 1-decene homopolymer hydrogenated.

The base oil preferably contains a minimum 50% synthetic oil; more preferably a minimum 55% synthetic oil; more preferably a minimum 60% synthetic oil; more preferably a minimum 65% synthetic oil; more preferably a minimum 70% synthetic oil.

As a further embodiment, Embodiment 6, the invention provides a composition as defined in any preceding Embodiment, wherein the composition comprises from 50-99 wt % base oil.

As a further embodiment, Embodiment 7, the invention provides a composition as defined in any preceding Embodiment, wherein the composition comprises from 80-99 wt % base oil.

The compositions of the invention comprise compressible hollow micro spheres each comprising a polymeric shell encapsulating a blowing agent. The polymeric shell is generally formed from a copolymer, for example a copolymer of vinylidene chloride and acrylonitrile or a copolymer of acrylonitrile and methacrylonitrile. The blowing agent can, for example, be isobutane or isopentane. In addition, the micro spheres can be expanded or unexpanded. The polymeric shell of the unexpanded micro spheres softens on heating, so allowing the evaporating blowing agent to expand the volume of the micro spheres. Such hollow micro spheres whether expanded or initially unexpanded, display a high degree of elasticity and additionally have a low specific weight. Use of such micro spheres in the gels disclosed in this invention is advantageous in that they lower the overall specific weight of the gels and thus reduce or eliminate drip-out during vertical laying of the cable. The hollow nature of the micro spheres means that the proportion of solid material is very low relative to the volume. Thus, their addition to the gels of the invention leads to a reduction in the overall thermal conductivity and a reduced likelihood of decomposition of any of the components of the gel or the creation of voids under the elevated temperatures reached during cable manufacture. The superior elastic properties of the hollow micro spheres over their solid counterparts gives improved protection to, for example, light wave guides during conveying, coiling or laying. Additionally, the problem of attenuation of light waveguides due to the presence of holes or cavities within the cable filling is also reduced as any increase in volume of the bulk of the filler due to heating during cable manufacture is matched by a converse reduction in the volume of the hollow micro spheres. Due to the compressible nature of such hollow micro spheres, their typical diameters are greater than those of their solid counterparts. In fibre optic cable applications, diameters in the range of the diameter of the light wave guide can be used. For expanded hollow micro spheres, the diameters will typically lie in the range 1-200 μm, more usually less than 100 μm, typically less than 75 μm, for example 15 to 55 μm. For unexpanded hollow micro spheres, the mean diameter prior to expansion is typically in the range up 50 μm, more usually less than 30 μm, for example in the range 10 to 20 μm.

The volume proportion of the micro spheres generally differs for solid and hollow counterparts. The solid micro spheres are typically employed in the volume range 1-50% by volume of the gel (v/v), more preferably in the range 5-50% v/v. Where hollow micro spheres are used, they are typically present in the range 1-95% v/v, more preferably 5-95% v/v, in particular 50-95% v/v, the foregoing figures referring to the expanded volumes.

As a further embodiment, Embodiment 8 the invention provides a composition as defined in any preceding Embodiment, wherein the compressible hollow microspheres are expanded.

As a further embodiment, Embodiment 9, the invention provides a composition as defined in Embodiment 8 wherein the expanded compressible hollow microspheres have an average diameter in the range of 15 to 55 μm.

As a further embodiment, Embodiment 10, the invention provides a composition as defined in Embodiment 8, wherein the expanded compressible hollow microspheres have an average diameter in the range of 20 to 40 μm.

As a further embodiment, Embodiment 11, the invention provides a composition as defined in Embodiment 8, wherein the expanded compressible hollow microspheres have an average diameter in the range of 25 to 35 μm.

As a further embodiment, Embodiment 12, the invention provides a composition as defined in any preceding Embodiment, wherein the microspheres each have a shell formed from a copolymer, such as a copolymer of acrylonitrile and methacrylonitrile (CAS number 38742-70-0).

As a further embodiment, Embodiment 13, the invention provides a composition as defined in any preceding Embodiment, wherein the composition contains substantially no thixotropic agent other than the organic polymeric gelling agent.

The term 'thixtropic agent' refers to a material which has a time-dependent, shear-thinning viscosity.

As a further embodiment, Embodiment 14, the invention provides a composition as defined in any preceding Embodiment, wherein the organic polymeric gelling agent comprises a thermoplastic elastomer.

The organic polymeric gelling agent comprises a styrene block copolymer, which may possess a di-block, a triblock, or a multi-arm molecular configuration.

As a further embodiment, Embodiment 15, the invention provides a composition as defined in any preceding Embodiment, wherein the organic polymeric gelling agent comprises a styrene block copolymer selected from styrene-ethylene/butylene styrene tri-block copolymer (SEBS), styrene-ethylene/propylene di-block copolymer (SEP), styrene-butadiene-styrene tri-block copolymer (SBS) and styrene-isoprene-styrene tri-block copolymer (SIS), or a mixture thereof.

As a further embodiment, Embodiment 16, the invention provides a composition as defined in any preceding Embodiment, wherein the organic polymeric gelling agent comprises styrene-ethylene/propylene di-block copolymer (SEP).

Suitable commercially available styrene block copolymers include the copolymers available under the trademark Kraton™ or Septon™.

As a further embodiment, Embodiment 17, the invention provides a composition as defined in any preceding Embodiment, comprising from 1 to 10 wt % of the organic polymeric gelling agent.

As a further embodiment, Embodiment 18, the invention provides a composition as defined in any preceding Embodiment, comprising from 2 to 9 wt % of the organic polymeric gelling agent.

As a further embodiment, Embodiment 19, the invention provides a composition as defined in any preceding Embodiment, comprising from 3 to 8 wt % of the organic polymeric gelling agent.

As a further embodiment, Embodiment 20, the invention provides a composition as defined in any preceding Embodiment, wherein the composition additionally comprises an anti-oxidant.

As a further Embodiment, Embodiment 21, the invention provides a composition as defined in Embodiment 20, wherein the anti-oxidant is selected from pentaerythritol tetrakis(β-laurylthiopropionate) (CAS No. 29598-76-3, Nauguard™ 4125), phenolic anti-oxidants (Brad-Chem™ 339), tetrakismethylene (3,5-di-tert-butyl-4-hydroxyhydrocinnamate) methane (Brad-Chem™ 391), thiodiethylene bis[3-(3,5-di-tert-butyl-4-hydroxyphenyl)propionate] (Brad-Chem™ 395), octylated phenyl-alpha-naphthylamine (Irganox™ L 06, BASF), octylated/butylated diphenylamine (Irganox™ L 57, BASF), a high weight phenolic anti-oxidant containing a thioether group (Irganox™ L115), a high weight phenolic anti-oxidant (Irganox™ L 135), Benzenamine, N-phenyl- (CAS number 68411-46-1, Irganox™ L 55), and a mixture of aminic and high molecular weight phenolic antioxidants (Irganox™ L150), and combinations thereof.

As a further embodiment, Embodiment 22, the invention provides a composition as defined in Embodiment 20, wherein the anti-oxidant is selected from pentaerythritol tetrakis(β-laurylthiopropionate) (CAS No. 29598-76-3, Nauguard™ 412S) and tetrakismethylene (3,5-di-tert-butyl-4-hydroxyhydrocinnamate) methane (Brad-Chem™ 391), or a combination thereof.

As a further embodiment, Embodiment 23, the invention provides a composition as defined in any preceding Embodiment, wherein the composition comprises from 0.1 to 1 wt % anti-oxidant.

As a further embodiment, Embodiment 24, the invention provides a composition as defined in any preceding Embodiment, wherein the composition additionally comprises a pour point depressant.

Suitable commercially available pour point depressants include Viscoplex™ 1-180 (Evonik) and Irgaoflo™ 649P (BASF), a dispersion of alkyl methacrylate co-polymer in mineral oil.

As a further embodiment, Embodiment 25, the invention provides a composition as defined in any preceding Embodiment, wherein the composition additionally comprises a wetting agent, such as polyproplyene glycol (PPG); and/or silica.

As a further embodiment, Embodiment 26, the invention provides the use of a composition as defined in any preceding Embodiment as a cable filler.

As a further embodiment, Embodiment 27, the invention provides a cable, such as a fibre optic cable, containing a composition as defined in any one of Embodiments 1 to 25.

As a further embodiment, Embodiment 28, the invention provides a cable comprising a conducting core surrounded by a sheath, a composition, as defined in any one of Embodiments 1 to 25, being disposed between the conducting core and the sheath, wherein the sheath comprises polypropylene.

The conducting core can be, for example, an electrical conductor or a light conductor. The electrical conductor can be, for example, a conductor for conducting electrical signals such as telephone signals.

As a further embodiment, Embodiment 29, the invention provides a process for making a cable comprising a conducting core and a sheath, the process comprising the step of extruding the cable sheath onto the conducting core and interposing a composition, as defined in any of Embodiments 1 to 25, between the conducting core and sheath during the extrusion step.

The compositions of the present invention may be prepared by a process comprising the steps:

(a) heating the synthetic oil to a temperature in the range 110° C. to 120° C.;

(b) adding the polymeric gelling agent to the oil and blending to form a mixture;

(c) cooling the mixture to a temperature of less than 90° C.;

(d) adding and blending in the microspheres; and optionally (e) maintaining the mixture under vacuum to remove entrapped gas.

Preferably the process comprises the steps:

(i) blending at least one synthetic oil in a heating-blending tank;

(ii) heating the blended oil(s) to 110-120° C. in a stirred heating-blending tank;

(iii) adding and blending the polymeric gelling agent to the oil(s) under high shear for no more than one hour after transfer of the oil(s) to a blending-cooling tank, allowing the temperature of the blend to rise to more than 120-130° C.;

(iv) cooling the blend to 90° C. and transferring to a stirred main reactor;

(v) adding and blending the microspheres, drawn to the reactor under vacuum or pumping, for at least two minutes;

(vii) maintaining the vacuum for at least another 10 minutes in order to effect removal of air bubbles prior to release of the finished gel.

EXAMPLES

FIG. 1 shows an optical cable 21 comprising three optical fibre buffer tubes 23 encased in cladding 22. The optical fibre buffer tubes 23 themselves consist of an optical fibre 24 provided with a protective coating 26 and a protective sheath 25. The filler composition of the invention 27 is disposed between the coated optical fibre and the protective sheath. Additionally, it fills the interstices formed between individual buffer tubes and between the buffer tubes and the internal surface of the cable cladding.

Examples of specific gels suitable for use in fibre optic cables, such as the cables illustrated in FIG. 1 are as follows:

Example 1

A gel filler was prepared having the following composition:

| Material | Function | % (Weight) |
|---|---|---|
| DaelimSynol™ Alpha 10 | Base Oil | 88.7 |
| Kraton™ 1701 | Organic polymeric gelling agent | 5.8 |
| Irganox™ L115 | Anti-oxidant | 0.3 |
| Expancel™ microspheres 920 DET 40d25 | Microsphere | 3.2 |

| Material | Function | % (Weight) |
|---|---|---|
| Cab-o-sil ™ Silica | Silica | 1.0 |
| PPG | Wetting agent | 0.5 |
| Viscoplex ™ 1-180 | Pour point depressant | 0.5 |

DaelimSynol ™ Alpha 10 (Daelim) is fully synthetic oil which is 1-octene homopolymer hydrogenated, a Group IV base oil, with CAS number 70693-43-5

Kraton ™ 1701: a styrenic block copolymer

Irganox ™ L115: a high weight phenolic anti-oxidant containing a thioether group PPG: polypropylene glycol, a wetting agent Viscoplex ™ 1-180: a polymer pour point depressant The gel filler was prepared by weighing out all materials other than the polymer, silica and the microsphere and heating these together at 120° C. with the hot plate set to 250° C. The polymer was added and the mixture mixed on half speed for 2 hours while the temperature was maintained at 120° C. then left overnight. The microspheres were added, followed by the silica, slowly by hand, and mixed on high speed for 5 minutes until smooth. The mixture was degassed.

The following Examples were prepared by an analogous process.

Example 2

| Material | Function | % (Weight) |
|---|---|---|
| DaelimSynol ™ Alpha 10 | Synthetic Oil | 62.1 |
| Petro Canada ™ 1810 | Conventional Oil | 26.6 |
| Kraton ™ 1701 | Organic polymeric gelling agent | 5.8 |
| Irganox ™ L115 | Anti-oxidant | 0.35 |
| Expancel ™ microspheres 920 DET 40d25 | Microsphere | 3.2 |
| Cab-o-sil ™ Silica | Silica | 1.0 |
| PPG | Wetting agent | 0.5 |
| Viscoplex ™ 1-180 | Pour point depressant | 0.5 |

Example 3

| Material | Function | % (Weight) |
|---|---|---|
| Risella ™ X430 | Synthetic Oil | 88.20 |
| Kraton ™ 1701 | Organic polymeric gelling agent | 7.95 |
| Irganox ™ L115 | Anti-oxidant | 0.35 |
| Viscoplex ™ 1-180 | Pour point depressant | 0.5 |
| Expancel ™ microspheres 920 DET 40d25 | Microsphere | 3 |

Risella ™ X 430 (Shell) is a synthetic gas-to-liquid oil with CAS number 848301-69-9

Example A

| Raw Material/Formulation | Function | % (Weight) |
|---|---|---|
| PAO 6 | Synthetic Oil | 88.35 |
| Kraton ™ 1701 | Organic polymeric gelling agent | 8.00 |
| Brad-Chem ™ 395/Irganox ™ L115 | Anti-oxidant | 0.15 |
| Expancel ™ 092DET 40 | Microsphere | 3.00 |
| Pour Point Depressant (such as Irgaoflo ™ 649P) | Pour point depressant | 0.50 |

Brad-Chem ™ 395: thiodiethylene bis[3-(3,5-di-tert-butyl-4-hydroxyphenyl)propionate]

PAO 6: 1-decene homopolymer hydrogenated, CAS number 68037-01-4, a polyalphaolefin oil commerically available from Petro-Canada ™ or Tulstar ™

The inventors have surprisingly found that the base oils comprising either 100% synthetic oils (as defined hereinabove), or a blend of synthetic and traditional oils, have low weight gain compatibility indication, preferably 15% or lower; more preferably 10% or lower.

Compatibility testing is carried out at elevated temperature over an extended time period and is essentially an accelerated ageing test. The period of storage that the chosen time period and temperature is equivalent to can be calculated using the following equation:

$$\text{Real Time Equivalent } (RT) = \text{Accelerated Ageing Time}(AAT) \times Q_{10}^{[\frac{(T_{AA}-T_{RT})}{10}]}$$

| Parameter | Meaning | Value |
|---|---|---|
| RT | Equivalent period in real time if stored at ambient temperature | Calculated |
| AAT | Time for which sample is held at elevated temperature | 28 days or otherwise specified |
| $Q_{10}$ | Ageing factor | 2.5 |
| $T_{AA}$ | Accelerated ageing factor | 80° C. |
| $T_{RT}$ | Ambient temperature | Measured |

Using the above equation, it can be calculated that a test period of 28 days at 80° C. is equivalent to 17.08 years of storage at ambient temperature if the ambient temperature is assumed to be 21° C.

The compositions comprising the base oils of the present invention were tested for weight gain compatibility in accordance with the following standard test method:

1. Petri dishes were prepared holding pieces of optical fibre (approximately 9 cm in length).
2. Gels samples comprising the base oils were added to the petri dishes, submerging the pieces of optical fibre. One petri dish was left without gel as a control,
3. Both the control petri dish and the sample petri dishes were placed in the oven at 80° C. and left for 28 days.
4. At the end of the test period, the petri dishes were removed from the oven and allowed to cool.
5. The fibre samples were removed, wiped, and checked for stability of the coloured coating.

When tested for compatibility with Borealis™ Polypropylene (PP1121-01) test pieces, the following results were obtained.

Table 1 details the results obtained from testing of raw oils. Two synthetic oils in accordance with the present invention (Risella™ X430 and DaelimSynol™ 40) are compared with a traditional petrochemical oil blend stock (Petro Canada™ Purity 1810 PAO 6) Table 2 details the results obtained from testing both raw oils and gel compositions comprising the oils. Gel compositions in accordance with the present invention comprising DaelimSynol™ Alpha 10 (Examples 1 and 2) were tested.

Table 3 details the results obtained from testing gel compositions. Gel compositions in accordance with the present invention were tested, the compositions comprising Risella™ X430 (Example 3) or comprising PAO 6 (Example A).

TABLE 1

| OIL | % Thickness change at End of Test | Time (days) | WEIGHT (g) A | % CHANGE A | WEIGHT (g) B | % CHANGE B | % Ave. (A + B) |
|---|---|---|---|---|---|---|---|
| Control sample* | N/A | 0 | 1.4379 | | 1.5834 | | |
| | | 7 | 1.4361 | −0.1252 | 1.5819 | −0.0947 | −0.1 |
| | | 14 | — | | — | | |
| | | 21 | 1.4369 | −0.0695 | 1.5822 | −0.0758 | −0.1 |
| | | 28 | 1.4362 | −0.1182 | 1.5818 | −0.1010 | −0.1 |
| Risella™ X430 | N/A | 0 | 1.4334 | | 1.5911 | | |
| | | 7 | 1.5244 | 6.3485 | 1.6892 | 6.1655 | 6.3 |
| | | 14 | — | | — | | |
| | | 21 | 1.5960 | 11.3437 | 1.7716 | 11.3444 | 11.3 |
| | | 28 | 1.6102 | 12.3343 | 1.7861 | 12.2557 | 12.3 |
| DaelimSynol™ 40 | N/A | 0 | 1.4244 | | 1.5979 | | |
| | | 7 | 1.4692 | 3.1452 | 1.6469 | 3.0665 | 3.1 |
| | | 14 | — | | — | | |
| | | 21 | 1.4952 | 4.9705 | 1.6772 | 4.9628 | 5.0 |
| | | 28 | 1.5002 | 5.3215 | 1.6838 | 5.3758 | 5.3 |
| Petro Canada™ Purity 1810 PAO 6 | N/A | 0 | 1.4388 | | 1.5822 | | |
| | | 7 | 1.6434 | 14.2202 | 1.7977 | 13.6203 | 13.9 |
| | | 14 | — | | — | | |
| | | 21 | 1.7226 | 19.7248 | 1.8902 | 19.4666 | 19.6 |
| | | 28 | 1.7378 | 20.7812 | 1.9060 | 20.4652 | 20.6 |

*control sample indicates a blank Borealis™ Polypropylene (PP1121-01) test piece.
Risella™ X 430 (Shell) is a synthetic gas-to-liquid oil, with CAS number 848301-69-9.
DaelimSynol™ 40 (Daelim) is synthetic Group IV base oil, which is an ethylene-propylene copolymer, with CAS number 9010-79-1.
Petro Canada™ Purity 1810 PAO 6 (Petro-Canada) is a 50-50 blend-stock of a traditional petrochemical oil with 1-decene homopolymer hydrogenated.

It can clearly be seen from Table 1 that the use of 100% of the synthetic oils Risella™ X430 and DaelimSynol™ 40, was shown to reduce the weight gain compatibility indication after 28 days at 80° C. to 12.3% and 5.3% respectively, compared with 20.6% for Petro Canada™ Purity 1810 PAO 6, a 50-50 blend-stock of a traditional petrochemical oil with 1-decene homopolymer hydrogenated

TABLE 2

| OIL/ EXAMPLE No | % Thickness change at End of Test | Time (days) | WEIGHT (g) A | % CHANGE A | WEIGHT (g) B | % CHANGE B | % Ave. (A + B) |
|---|---|---|---|---|---|---|---|
| Control sample* | Start: 0.0774 | 0 | 1.4772 | | 1.5159 | | |
| | 0.00% | 7 | — | | — | | |
| | End: 0.0774 | 14 | 1.4752 | −0.1354 | 1.5140 | −0.1253 | −0.1 |
| | | 21 | 1.4749 | −0.1557 | 1.5138 | −0.1385 | −0.1 |
| | | 28 | 1.4754 | −0.1219 | 1.5142 | −0.1121 | −0.1 |
| Oil 100% DaelimSynol™ Alpha 10 | Start: 0.0774 | 0 | 1.4651 | | 1.5476 | | |
| | 0.26% | 7 | — | | — | | |
| | End: 0.0776 | 14 | 1.5324 | 4.5935 | 1.6160 | 4.4197 | 4.5 |
| | | 21 | 1.5496 | 5.7675 | 1.6357 | 5.6927 | 5.7 |
| | | 28 | 1.5626 | 6.6548 | 1.6501 | 6.6232 | 6.6 |
| Oil 70% Alpha 10 30% PC1810 | Start: 0.0760 | 0 | 1.5068 | | 1.5573 | | |
| | 0.66% | 7 | — | | — | | |
| | End: 0.0765 | 14 | 1.6528 | 9.6894 | 1.7081 | 9.6834 | 9.7 |
| | | 21 | 1.6749 | 11.1561 | 1.7312 | 11.1668 | 11.2 |
| | | 28 | 1.6876 | 11.9989 | 1.7439 | 11.9823 | 12.0 |
| EXAMPLE 1 | Start: 0.0774 | 0 | 1.4409 | | 1.5817 | | |
| | 0.52% | 7 | — | | — | | |
| | End: 0.0778 | 14 | 1.5055 | 4.4833 | 1.6529 | 4.5015 | 4.5 |
| | | 21 | 1.5241 | 5.7742 | 1.6720 | 5.7090 | 5.7 |
| | | 28 | 1.5366 | 6.6417 | 1.6866 | 6.6321 | 6.6 |

TABLE 2-continued

| OIL/ EXAMPLE No | % Thickness change at End of Test | Time (days) | WEIGHT (g) A | % CHANGE A | WEIGHT (g) B | % CHANGE B | % Ave. (A + B) |
|---|---|---|---|---|---|---|---|
| EXAMPLE 2 | Start: 0.0760 | 0 | 1.5065 | | 1.5136 | | |
| | 0.13% | 7 | — | | — | | |
| | End: 0.0761 | 14 | 1.6422 | 9.0076 | 1.6588 | 9.5930 | 9.3 |
| | | 21 | 1.6676 | 10.6937 | 1.6788 | 10.9144 | 10.8 |
| | | 28 | 1.6798 | 11.5035 | 1.6912 | 11.7336 | 11.6 |

*control sample indicates a blank Borealis ™ Polypropylene (PP1121-01) test piece.
PC1810: a traditional petrochemical oil (Petro Canada ™)

The % Ave. (A+B) is the weight gain compatibility indication. As can be seen from Table 2, The 100% synthetic oil, DaelimSynol™ Alpha 10, was found to have a weight gain compatibility indication after 28 days at 80° C. of average 6.6%, while a blended oil consisting of a mixture of 70% Alpha 10 and 30% non-synthetic PC1810 was found to have a weight gain compatibility indication of 12.0. When formulated into a gel composition in accordance with the present invention, the weight gain compatibility indication was found to be 6.6 for EXAMPLE 1, a gel composition comprising 100% Alpha 10 (a Group IV oil), and 11.6 for EXAMPLE 2, a gel composition comprising 70% Alpha 10 and 30% PC1810. Improved weight gain compatibility was observed for both compositions when compared with 100% petrochemical oils.

TABLE 3

| GEL | % Thickness change at End of Test | Time (days) | WEIGHT (g) A | % CHANGE A | WEIGHT (g) B | % CHANGE B | % Ave. (A + B) |
|---|---|---|---|---|---|---|---|
| EXAMPLE 3 | Start: 0.0752 | 0 | 1.4915 | | 1.5946 | | |
| | 1.3% | 7 | 1.5856 | 6.3091 | 1.6953 | 6.3151 | 6.3 |
| | End: 0.0762 | 14 | 1.6389 | 9.8827 | 1.7525 | 9.9022 | 9.9 |
| | | 21 | 1.6644 | 11.5924 | 1.7796 | 11.6017 | 11.6 |
| | | 28 | 1.6781 | 12.5109 | 1.7935 | 12.4733 | 12.5 |
| EXAMPLE A | Start: 0.0775 | 0 | 1.4337 | | 1.5343 | | |
| | −1.6% | 7 | 1.6399 | 14.3824 | 1.7597 | 14.6907 | 14.5 |
| | End: 0.0763 | 14 | 1.7015 | 18.6789 | 1.8197 | 18.6013 | 18.6 |
| | | 21 | 1.7234 | 20.2065 | 1.8427 | 20.1004 | 20.2 |
| | | 28 | 1.7370 | 21.1551 | 1.8576 | 21.0715 | 21.1 |

It can be seen from TABLE 3, that EXAMPLE 3, a gel composition of the invention comprising a fully synthetic gas-to-liquid oil, was shown to have an average weight gain compatibility indication after 28 days at 80° C. of 12.5%, compared with 21.1 for a composition comprising a 50:50 blend of a traditional petrochemical oil with PAO6 (Example A).

The invention claimed is:

1. A composition suitable for use as a cable filler, comprising a dispersion of compressible hollow microspheres in a gel, the gel comprising: a base oil comprising a synthetic oil; and an organic polymeric gelling agent comprising a styrene block copolymer; wherein the synthetic oil comprises a gas-to-liquid oil.
2. A composition as defined in claim 1 wherein the synthetic oil comprises more than one gas-to-liquid oil.
3. A composition as defined in claim 1, wherein the base oil comprises a fully synthetic oil.
4. A composition as defined in claim 1, wherein the base oil comprises a blended synthetic oil.
5. A composition as defined in claim 1, wherein the base oil does not comprise a 1-decene homopolymer hydrogenated.
6. A composition as defined in claim 1, wherein the composition comprises from 50-99 wt % base oil.
7. A composition as defined in claim 1, wherein the compressible hollow microspheres are expanded.
8. A composition as defined in claim 1, wherein the compressible hollow microspheres are expanded with an average diameter in the range of 15 to 55 μm.
9. A composition as defined in claim 1, wherein the microspheres each have a shell formed from a copolymer, such as a copolymer of acrylonitrile and methacrylonitrile (CAS number 38742-70-0).
10. A composition as defined in claim 1, wherein the composition contains substantially no thixotropic agent other than the organic polymeric gelling agent.
11. A composition as defined in claim 1, wherein the organic polymeric gelling agent comprises a styrene block copolymer selected from styrene-ethylene/butylene styrene tri-block copolymer (SEBS), styrene-ethylene/propylene di-block copolymer (SEP), styrene-butadiene-styrene tri-block copolymer (SBS) and styrene-isoprene-styrene tri-block copolymer (SIS), or a mixture thereof.
12. A composition as defined in claim 1, comprising from 1 to 10 wt % of the organic polymeric gelling agent.
13. Use of a composition as defined in claim 1 as a cable filler.
14. A cable, such as a fibre optic cable, containing a composition as defined in claim 1.
15. A cable comprising a conducting core surrounded by a sheath, a composition as defined in claim 1 being disposed between the conducting core and the sheath, wherein the sheath comprises polypropylene.
16. A process for making a cable comprising a conducting core and a sheath, the process comprising the step of extruding the cable sheath onto the conducting core and interposing a composition, as defined in claim 1, between the conducting core and sheath during the extrusion step.

\* \* \* \* \*

UNITED STATES PATENT AND TRADEMARK OFFICE
CERTIFICATE OF CORRECTION

| | | |
|---|---|---|
| PATENT NO. | : 11,760,880 B2 | Page 1 of 1 |
| APPLICATION NO. | : 17/378523 | |
| DATED | : September 19, 2023 | |
| INVENTOR(S) | : Scott Allen et al. | |

It is certified that error appears in the above-identified patent and that said Letters Patent is hereby corrected as shown below:

In the Specification

Column 5, Line 17, "4125" should be --412S--.

Signed and Sealed this
Thirtieth Day of July, 2024

Katherine Kelly Vidal
*Director of the United States Patent and Trademark Office*